(12) United States Patent
Castillo et al.

(10) Patent No.: US 10,245,987 B2
(45) Date of Patent: Apr. 2, 2019

(54) ACTIVE VEHICLE SEAT ARCHITECTURE FOR INERTIAL COMPENSATION IN MOTOR VEHICLES

(71) Applicant: GM GLOBAL TECHNOLOGY OPERATIONS LLC, Detroit, MI (US)

(72) Inventors: Brian V. Castillo, Birmingham, MI (US); Giles D. Bryer, Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 85 days.

(21) Appl. No.: 15/387,695

(22) Filed: Dec. 22, 2016

(65) Prior Publication Data

US 2018/0178690 A1 Jun. 28, 2018

(51) Int. Cl.
*B60N 2/50* (2006.01)
*B60N 2/02* (2006.01)
*B60N 2/00* (2006.01)

(52) U.S. Cl.
CPC ............ *B60N 2/501* (2013.01); *B60N 2/002* (2013.01); *B60N 2/0244* (2013.01); *B60N 2002/0268* (2013.01)

(58) Field of Classification Search
None
See application file for complete search history.

(56) References Cited

U.S. PATENT DOCUMENTS

| 5,975,508 | A | 11/1999 | Beard | |
| 7,543,792 | B1* | 6/2009 | Ursel | B60N 2/0232 248/550 |
| 2006/0261647 | A1* | 11/2006 | Maas | B60N 2/0244 297/216.1 |
| 2009/0272871 | A1 | 11/2009 | Haller | |
| 2010/0052356 | A1 | 3/2010 | Lewis, II | |
| 2010/0133413 | A1 | 6/2010 | Wahls et al. | |
| 2015/0231992 | A1 | 8/2015 | Gundall et al. | |

* cited by examiner

*Primary Examiner* — Abby Y Lin
*Assistant Examiner* — Kyung J Kim
(74) *Attorney, Agent, or Firm* — Quinn IP Law

(57) ABSTRACT

Disclosed are active vehicle seat assemblies, methods for making and using such seat assemblies, and vehicles with active seat assemblies for counteracting unwanted inertial forces. An active vehicle seat assembly is disclosed that includes an occupant chair with interconnected seat and backrest portions. A motion sensor detects motion of the occupant chair and outputs signals indicative thereof. An automated platform movably mounts the occupant chair to the vehicle body. The platform includes: a pitch plate that pivots about two lateral axes; a pitch actuator that selectively pivots the pitch plate; a roll plate that pivots about two longitudinal axes; and a roll actuator that selectively pivots the roll plate. An on-board controller responds to signals from the motion sensor indicative of inertial motion disturbances to the chair by transmitting control signals to the pitch and/or roll actuators to pivot the pitch and/or roll plates to thereby counteract the inertial disturbances.

20 Claims, 3 Drawing Sheets

ACTIVE VEHICLE SEAT ARCHITECTURE FOR INERTIAL COMPENSATION IN MOTOR VEHICLES

INTRODUCTION

The present disclosure relates generally to seat assemblies for motor vehicles. More specifically, aspects of this disclosure relate to active vehicle seat systems, and control methods for operating the same, for isolating occupants from inertial forces generated through operation of a motor vehicle.

Current production motor vehicles, such as the modern-day automobile, are originally equipped with driver-side, passenger-side and rear bench-style seat assemblies for comfortably seating the occupants of the vehicle. A vehicle seat assembly may be composed of an internal skeletal seat frame that is mounted to the vehicle body, for example, via a fore-and-aft slide rail assembly. Foam cushions overlay and attach to complementary wire suspension segments of the framework to separate the occupant from the rigid seat frame. Flexible covers, such as fabric, leather, or vinyl trim, conceal any readily visible segments of the frame and the foam cushions to form the occupiable exterior surfaces of the seat. Driver-side and passenger-side front seat assemblies can be typified by an upper, generally vertical backrest portion that is tiltable relative to a lower, generally horizontal seat portion.

During operation of a vehicle, the driver and passengers can be exposed to undesirable inertial forces that result from accelerating, decelerating and cornering the vehicle. Road-induced vibrations can also be experienced by an occupant through a seat assembly during operation of the vehicle, e.g., when driving over irregularly spaced road displacements, such as potholes and speed bumps. Epidemiological studies have shown that prolonged exposure to these excitation forces can have adverse effects on the operator and passengers. For instance, the motion disturbances generated through operation of such vehicles can increase operator fatigue and can result in considerable occupant discomfort over sustained driving periods. It is oftentimes desirable to minimize motion disturbances that are otherwise transmitted through a vehicle seat assembly to improve the occupant's experience during operation of the vehicle.

SUMMARY

Disclosed herein are active vehicle seat architectures for motor vehicles, methods for making and methods for using such vehicle seat assemblies and systems, and motor vehicles with an active vehicle seat assembly for isolating an occupant from road-induced vibrations and inertial forces generated during operation of the vehicle. By way of example, and not limitation, there is presented a novel active seat assembly that is mounted to the vehicle body by an articulated suspension and isolation platform. The system employs an accelerometer (e.g., a single-axis accelerometer or a 3-axis accelerometer), a gyroscope (e.g., a 3-axis gyroscope), an occupant proximity sensor (e.g., capacitive-based proximity sensors, silicon piezoresistive pressure sensors, etc.) and/or other sensing devices that communicate sensing data to a processor. This processor is executing memory-stored control algorithms to automate movement of the seat in real-time and thereby counteract or otherwise isolate the occupant from inertial forces and road-induced vibrations. Fore-aft (lengthwise) rectilinear motion and inboard-outboard (transverse) rectilinear motion can be achieved through an automated slide frame mounted on longitudinally oriented and laterally oriented slide tracks, respectively. Pitch, roll and yaw counteracting motions can each be automated with a dedicated actuator that controls pivotable motion of an actuation plate.

Occupant isolating functionality can be achieved by rotating and/or translating the seat in at least one, desirably two, and as many as three axes. Some embodiments focus on a configuration where X-axis rotation is accomplished by articulating the passenger compartment as a whole and Y-axis rotation is accomplished by articulation of the seat assembly. One or more of the disclosed configurations omit controlled Z-axis (yaw) rotation and related motions. This helps to achieve compactness of packaging and to drive an overall vehicle size that is comparable to existing vehicles. At least some of the disclosed configurations employ simple hinged motion with an axis of rotation coincident with or proximate to the estimated hip point (H-point), driven by a linear actuator, to isolate or otherwise offset pitch (y-axis), roll (x-axis), and yaw (z-axis) motions. Optionally or alternatively, a four-bar linkage with a virtual center at or around the H-point, driven by a diagonally oriented linear actuator, can be employed to isolate or otherwise offset pitch, roll and (if so desired) yaw motions.

Attendant benefits for at least some of the disclosed concepts include increased compactness over other available active seat architectures. Disclosed embodiments allow for chair heights (e.g., measured in the vertical Z-direction, from H-point to heel) that are within normal ranges found in ordinary vehicles, typically between about 275 mm and about 425 mm, and therefore can accommodate most occupants. By comparison, many prior known active seat configurations require unusually tall chair heights to accommodate additional subjacent packaging space for larger automated system architectures. In addition, prior known designs are designed to maintain a rotation point about an occupant's head, nominally to prevent the head from translating in space as the seat undergoes rotational motions. This, in turn, requires seat actuators with sufficient power to lift the entire mass of the occupant and chair during rotation. Recognizing that this translational motion is both likely (since H-point to head dimension varies with individual occupant stature) and generally of low magnitude, disclosed designs center rotation about the H-point, which is roughly equivalent to the center of mass and tends not to vary as significantly with occupant stature. This enables actuator motors that are smaller, less expensive, and more responsive as they are not required to lift the mass of the occupant, but only to rotate it. Many of the disclosed designs are conducive to the inclusion of an optional piston-style pyrotechnic actuator for the rapid repositioning of the occupant to a recumbent posture for management of impact-event accelerations.

Aspects of the present disclosure are directed to vehicle-controlled active vehicle seat assemblies for motor vehicles, with particular applicability to counteracting inertial motion disturbances generated through acceleration, deceleration and cornering operations of an autonomous vehicle. Disclosed, for example, is an active vehicle seat assembly for a motor vehicle. The active vehicle seat assembly includes an occupant chair with a generally horizontal seat portion that is connected (e.g., in a reclinable manner) to a generally vertical backrest portion. One or more motion sensors, each of which is connected to the occupant chair, detect motion of the occupant chair, such as translational or rotational displacement, velocity and/or acceleration, and output signals indicative thereof. An automated platform subjacent the seat portion movably mounts the occupant chair to the vehicle body. The automated platform includes a pitch plate that pivots relative to the lateral (pitch) axis of the vehicle body, and a pitch actuator that is connected to and selectively pivots the pitch plate. Also included is a roll plate that pivots relative to the longitudinal (roll) axis of the vehicle body, and a roll actuator that is connected to and selectively pivots the roll plate. An on-board controller is communicatively connected to the motion sensor, the pitch actuator, and the roll actuator. This controller is operable to respond to a motion signal from the motion sensor indicative of an inertial motion disturbance to the occupant chair and output a control signal to the pitch actuator and/or roll actuator to selectively pivot the pitch plate and/or roll plate to thereby counteract the inertial motion disturbance.

Other aspects of the present disclosure are directed to motor vehicles with one or more vehicle-controlled active vehicle seat assemblies. A "motor vehicle," as used herein, may include any relevant vehicle platform, such as passenger vehicles (internal combustion engine (ICE), hybrid, electric, fuel cell, etc.), commercial vehicles, industrial vehicles, tracked vehicles, all-terrain vehicles (ATV), farm equipment, boats, trains, airplanes, spacecraft, etc. A "motor vehicle," as used herein, may also include driver controlled National Highway Traffic Safety Administration (NHTSA) classified Level 0 automobiles, fully autonomous "driverless" NHTSA Level 4 classified automobiles, and any variation therebetween. In an example, a motor vehicle is disclosed that includes a vehicle body with a passenger compartment, a base plate disposed within the passenger compartment, and an occupant chair supported on the base plate. The occupant chair is composed of a backrest portion, a seat portion connected to the backrest portion, and a pair of glide rails connected to the underside of the seat portion. The motor vehicle also includes a 3-axis accelerometer that detects motion of the occupant chair and outputs signals indicative thereof to an on-board controller.

Underneath the seat portion is an automated platform that movably mounts the occupant chair to the base plate of the vehicle body. This automated platform includes a pitch plate with a pair of seat tracks slidably mated with the glide rails of the occupant chair, and a roll plate that is interposed between the pitch plate and the base plate. A four-bar (pitch) linkage pivotably couples the pitch plate to the roll plate such that the pitch plate is pivotable about two distinct pitch axes that are mutually parallel to a lateral axis of the vehicle body. Likewise, a four-bar (roll) linkage pivotably couples the roll plate to the base plate such that the roll plate is pivotable about two distinct roll axes that are mutually parallel to a longitudinal axis of the vehicle body. An electronically actuable linear (pitch) actuator is connected to and operable to selectively pivot the pitch plate fore-and-aft about the two pitch axes. Another electronically actuable linear (roll) actuator is connected to and operable to selectively pivot the roll plate inboard-and-outboard about the two roll axes. The on-board controller receives one or more motion signals from the accelerometer indicative of an inertial motion disturbance to the occupant chair, and responds by outputting one or more control signals to the pitch and/or roll actuators to pivot the pitch and/or roll plates in order to counteract the inertial motion disturbance.

Additional aspects of this disclosure are directed to methods of making and methods of using vehicle-controlled active vehicle seat assemblies for motor vehicles. For instance, a method is disclosed for constructing an active vehicle seat assembly for a motor vehicle having a vehicle body with a base plate. The method includes, in any order and in any combination: providing an occupant chair with a seat portion attached to a backrest portion; attaching a motion sensor to the occupant chair, the motion sensor being configured to detect motion of the occupant chair and output signals indicative thereof; attaching an automated platform to the seat portion, the automated platform being configured to movably mount to the vehicle body, the automated platform including: a pitch plate configured to pivot relative to the lateral axis; a pitch actuator connected to and configured to selectively pivot the pitch plate; a roll plate configured to pivot relative to the longitudinal axis; and a roll actuator connected to and configured to selectively pivot the roll plate; and, communicatively connecting an on-board controller to the motion sensor, the pitch actuator, and the roll actuator. The on-board controller is operable to respond to a motion signal from the motion sensor indicative of an inertial motion disturbance to the occupant chair and output a control signal to one or both of the pitch and roll actuators to selectively pivot one or both of the pitch and roll plates and thereby counteract the inertial motion disturbance.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
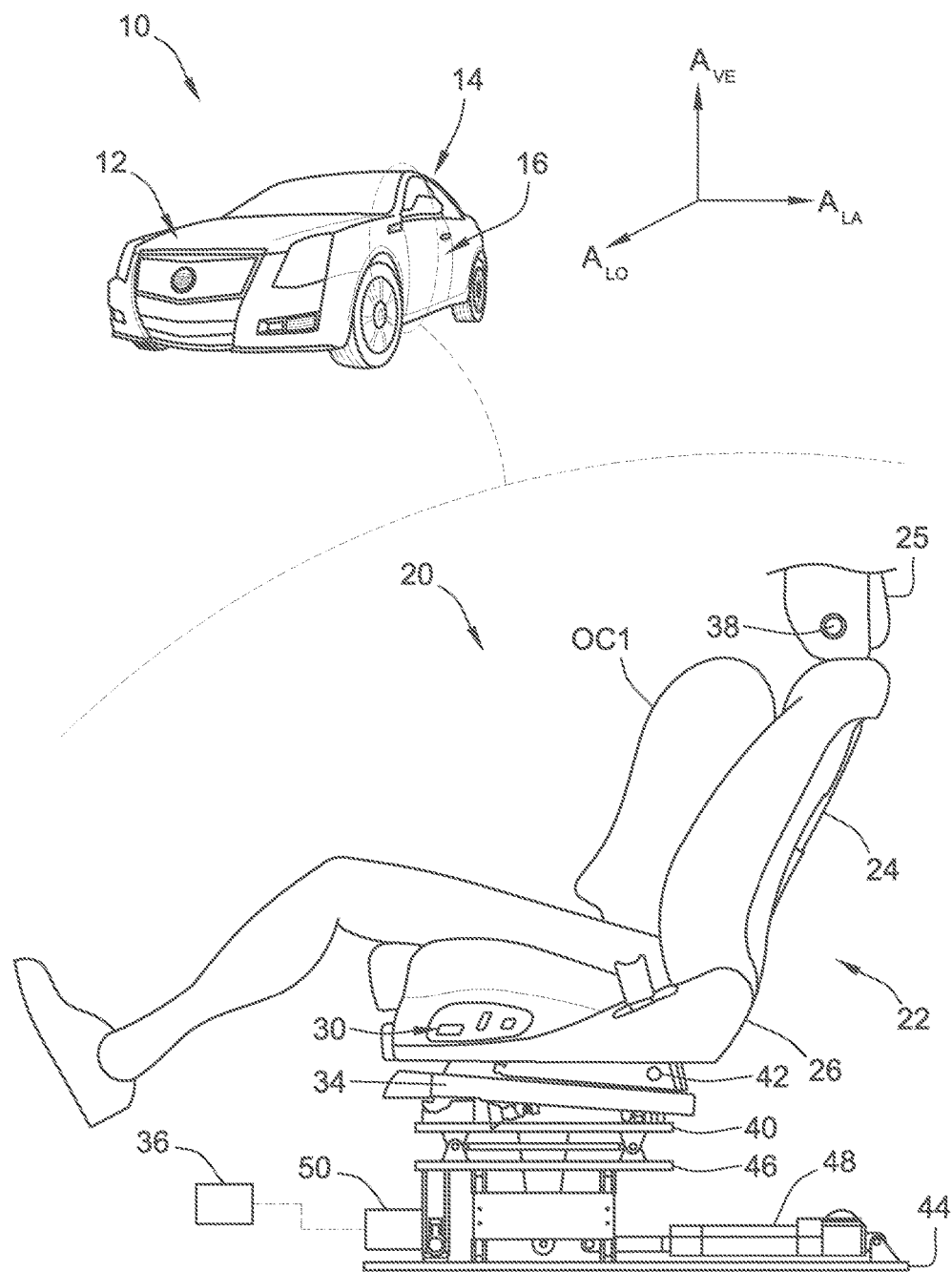
FIG. 1 is a front perspective-view illustration of a representative motor vehicle with an inset side-view illustration of an active vehicle seat assembly in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, and alternatives falling within the spirit and scope of the disclosure as defined by the appended claims.

DETAILED DESCRIPTION

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a perspective-view illustration of a representative automobile, which is designated generally at 10 and portrayed herein for purposes of discussion as a two-door coupe-style passenger vehicle. Mounted proximate a forward end of the automobile 10, e.g., located aft of the engine compartment 12, adjacent a driver-side vehicle door 16 within the passenger compartment 14, is an active vehicle seat assembly 20. The illustrated automobile 10—also referred to herein as "motor vehicle" or "vehicle" for short—is merely an exemplary application with which the novel aspects and features of this disclosure can be practiced. In the same vein, the implementation of the present concepts into a single-occupant driver-side seat assembly should also be appreciated as an exemplary application of the novel concepts disclosed herein. As such, it will be understood that the aspects and features of the present disclosure can be applied to other occupant seat assemblies and utilized for any logically relevant type of motor vehicle. Lastly, the drawings presented herein are not necessarily to scale and are provided purely for instructional purposes. Thus, the specific and relative dimensions shown in the drawings are not to be construed as limiting.

Figure 2:
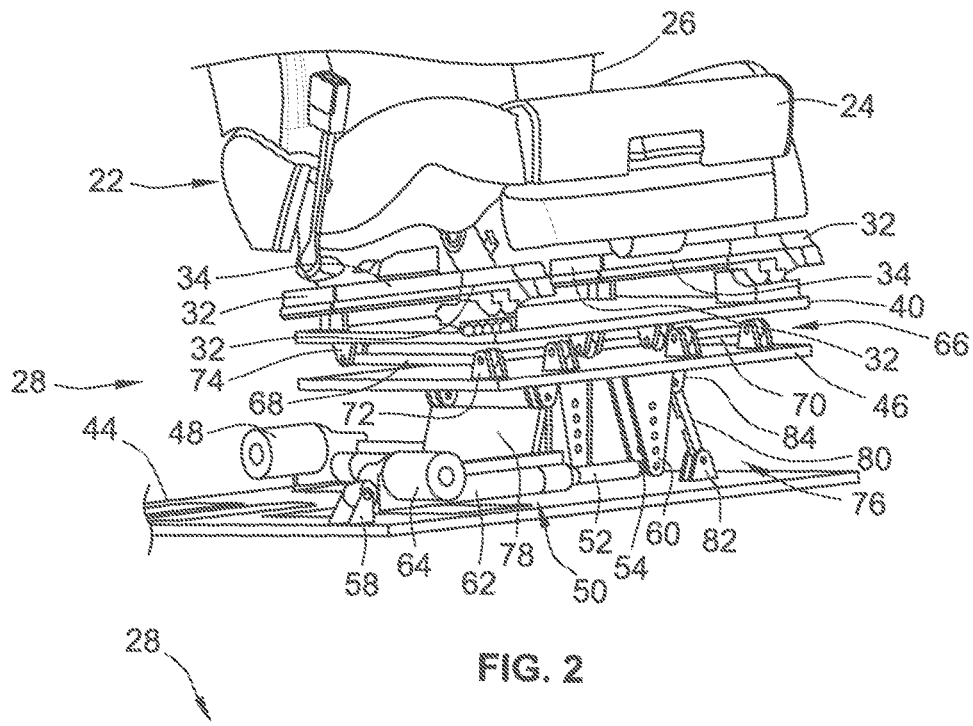
FIG. 2 is an enlarged front perspective-view illustration of the representative vehicle seat assembly of FIG. 1 showing the seat portion mounted to the vehicle body via an automated suspension and isolation platform in accordance with aspects of the present disclosure.

To provide comfortable, yet functional support for at least one occupant OC1 during operation of the automobile 10, the seat assembly 20 is provided with a bucket-style occupant chair 22 in FIG. 1 that is contoured, for example, to securely retain riders in place during velocity changes and maneuvering operations. The occupant chair 22 includes a generally vertical backrest portion 24 (also referred to as "seatback" or "backrest") that is connected to a generally horizontal seat portion (also referred to as "seat bottom" or "seat") 26, both of which receive subjacent support by an automated platform assembly 28. Both the backrest and seat 24, 26 can comprise components and features typical to vehicle backrests and seats, such as cushions of various designs, materials, and durometer ratings (e.g., Shore A or OO), as well as any requisite internally or externally located support structure. Moreover, occupant chair 22 may have a "power seat" configuration where the heights, angles and/or fore-aft positions of the backrest portion 24 and seat portion 26 may be individually and/or collectively adjustable, e.g., through a motorized seat adjustment system 30. Whether automated or manual, the occupant chair 22 can be moved to a desired fore-aft position, relative to the vehicle 10, by laterally spaced glide rails 32 (FIG. 2). These glide rails 32 are mounted underneath the seat portion 26 and slidably coupled to a pair of longitudinally oriented seat tracks 34 that are mounted on a pitch plate 40 of the platform assembly 28.

Vehicle-controlled active seat assembly 20 (or simply "seat assembly" for short) is designed to isolate an occupant OC1 from undesirable inertial forces, such as those that result from accelerating, decelerating and cornering the vehicle 10. This functionality can generally be provided through the collaborative operation between the automated platform assembly 28 and an on-board controller 36 that communicates (wired or wirelessly) with one or more sensing devices. According to the illustrated example, a motion sensor 38, which is connected to the occupant chair 22, e.g., packaged inside a headrest portion 25, detects motion of the occupant chair 22 and outputs electrical signals indicative thereof. For at least some preferred embodiments, the motion sensor 38 is a low voltage tri-axial analog accelerometer that can detect orientation, shake, tap, fall, tilt, motion, positioning, shock or vibration, or any combination thereof, along the longitudinal axis $A_{LO}$, lateral axis $A_{LA}$, and vertical axis $A_{VE}$ of the vehicle 10. A position sensor 42, which may be in the nature of a linear taper potentiometer packaged underneath the seat 26 on or adjacent the seat tracks 34, is operable to detect the current position of the occupant chair 22 relative to the automated platform 28 and output an electrical signal indicative thereof to the on-board controller 36. There are numerous other types of sensing devices that can be utilized, including, for example, acoustic sensing devices, such as ultrasonic sensors, optical sensing devices, such as light-based and laser-based sensors, capacitive sensing devices, such as capacitive-based proximity sensors, pressure sensors, such as silicon piezoresistive pressure sensors, etc. In addition, the respective packaging location of each sensor can be varied from that which is shown in the drawings.

Situated below the seat portion 26, the automated platform 28 is designed to movably mount the occupant chair 22 to the vehicle body, such as a rigid base plate 44 defined by or rigidly coupled to the floor of passenger compartment 14. Occupant isolating functionality through the mitigation or cancelation of undesirable inertial motion disturbances can be achieved by rotating and/or translating the occupant chair 22 with respect to least one, desirably two, and as many as three vehicle axes. According to the representative example of FIGS. 2 and 3, the automated platform 28 is composed of a pitch plate 40 that pivots relative to the lateral (pitch) axis $A_{LA}$ of the vehicle body, and a roll plate 46 that pivots relative to the longitudinal (roll) axis $A_{LO}$ of the vehicle body. Both of these plates 40, 46, when in a neutral (inactive) position, can be generally parallel to, and vertically spaced from the base plate 44. While not shown, automated platform 28 may further comprise a yaw plate that rotates relative to the vertical (yaw) axis $A_{VE}$ of the vehicle body. It is also envisioned that the pitch and roll plates 40, 46 be combined into a single plate configuration. Although shown as square-shaped polyhedral panels, the pitch and roll plates 40, 46 may comprise other shapes, sizes, and structural configurations (such as rigid crossbars) within the scope of this disclosure.

Figure 3:
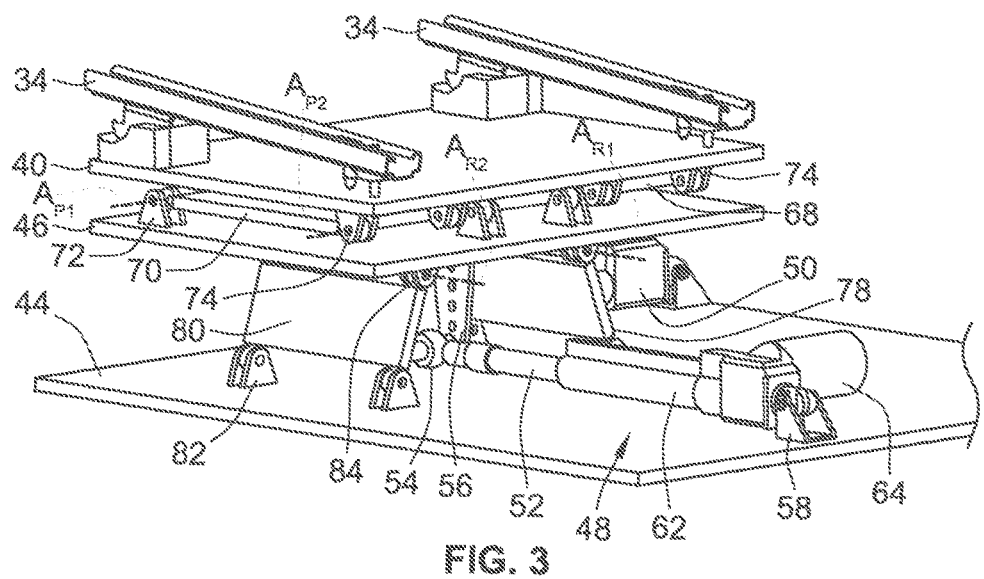
FIG. 3 is a rear perspective-view illustration of the automated suspension and isolation platform of the active vehicle seat assembly of FIG. 1.

Selective fore-and-aft pitch of the occupant chair 22 is provided through the activation of a pitch actuator 48 that is mechanically coupled to the pitch plate 40. Correspondingly, selective inboard-outboard roll of the occupant chair 22 is provided through the activation of a roll actuator 50 that is mechanically coupled to the roll plate 46. By way of example, and not limitation, the pitch and roll actuators 48, 50 are low-voltage electronically actuable DC-motor driven linear actuators (e.g., 12V; 2 to 4 inch stroke; 200 to 300 lbs. rated). Alternative configurations may utilize linear and non-linear actuators or transducers of other forms, including hydraulic, pneumatic, pyrotechnic, piezoelectric, and other electro-mechanical designs. A first "plate-coupling" end of each actuator 48, 50 is rotatably coupled to their respect plate 40, 46, while a second "base-coupling" end of each actuator 48, 50 is rotatably coupled to the vehicle body's base plate 44. For instance, the linear (pitch) actuator 48 includes a reciprocally translating piston 52 with a spherical ball joint 54 on a distal end thereof. This ball joint 54 is rotatably coupled to a pair of elongated flanges 56 welded to and projecting downwardly from the underside of the pitch plate 40 through a cutout slot (not visible) in the roll plate 46, as best seen in FIG. 3. At the opposite end of the actuator 48 from the spherical joint 54 is a roller hinge 58 that rotatably couples a cylinder 62 and electric motor 64 of the linear (pitch) actuator 48 to the base plate 44. In the same vein, the linear (roll) actuator 50 also includes a reciprocally translating piston 52 with a spherical ball joint 54 on a distal end thereof. This ball joint 54 is rotatably coupled to a pair of elongated flanges 60 welded to and projecting downwardly from the underside of the roll plate 46, as best seen in FIG. 2. At the opposite end of the actuator 50 from the spherical joint 54 is a roller hinge 58 that rotatably couples a cylinder 62 and electric motor 64 of the linear (roll) actuator 50 to the base plate 44.

With reference to FIGS. 2 and 3, the pitch plate 40 is selectively actuable via the on-board controller 36, through transmission of command signals to the linear actuator 48, to offset or otherwise ameliorate rotational inertia disturbances about lateral (pitch) axis $A_{LA}$. A four-bar (pitch) linkage, designated generally at 66 in FIG. 2, is a movable closed-chain linkage that mechanically couples the pitch plate 40 to the roll plate 46. For at least some preferred configurations, the four-bar linkage 66 is composed of at least first and second (pitch) actuation plates 68 and 70, respectively, and first and second sets of (pitch) pivot joints 72 and 74, respectively. Represented herein as revolute roller hinges, the first set of pitch pivot joints 72 hingedly couples first (forward) ends of the pitch actuation plates 68, 70 to the roll plate 46, while the second set of pivot joints 74 hingedly couples second (rear) ends of the pitch actuation plates 68, 70 to the pitch plate 40. These pivot joints 72, 74 cooperatively define first and second pitch axes $A_{P1}$ and $A_{P2}$, respectively, which are mutually parallel with the lateral axis $A_{LA}$ of the vehicle 10. With this architecture, the pitch plate 40 pivots about the first pitch axis $A_{P1}$ when pitching in a first (forward) direction, and pivots about the second pitch axis $A_{P2}$ when pitching in a second (rearward) direction with respect to the vehicle 10.

With continuing reference to FIGS. 2 and 3, the roll plate 46 is selectively actuable via the on-board controller 36, through transmission of command signals to the linear actuator 50, to offset or otherwise ameliorate rotational inertia disturbances about longitudinal (roll) axis $A_{LO}$. A four-bar (roll) linkage, designated generally at 76 in FIG. 2, is a movable closed-chain linkage that mechanically couples the roll plate 46 to the base plate 44. For at least some preferred configurations, the four-bar linkage 76 is composed of at least first and second (roll) actuation plates 78 and 80, respectively, and first and second sets of (roll) pivot joints 82 and 84, respectively. Similar to the four-bar pitch linkage 66 described above, the roll pivot joints are represented herein as revolute roller hinges, with the first set of roll pivot joints 82 hingedly coupling first ends of the roll actuation plates 78, 80 to the base plate 44, while the second set of pivot joints 84 hingedly couple second ends of the roll actuation plates 78, 80 to the roll plate 44. These pivot joints 82, 84 define first and second roll axes $A_{R1}$ and $A_{R2}$, respectively, which are mutually parallel with the longitudinal axis $A_{LO}$ of the vehicle 10. The roll plate 46 pivots about the first roll axis $A_{R1}$ when rolling in a first (inboard) direction, and pivots about the second roll axis $A_{R2}$ when rolling in a second (outboard) direction with respect to the vehicle 10. It is envisioned that the roll and pitch actuation plates, while shown as square-shaped panels, may comprise other shapes, sizes, and structural configurations (such as rigid crossbars) within the scope of this disclosure.

The on-board controller 36, which is communicatively connected to the various sensors and actuators, implements processor-executable instructions (e.g., those indicated in FIG. 4 and stored, for example, in resident memory) to receive and process one or more motion signals from one or more motion sensors (e.g., accelerometer 38) that is/are indicative of an inertial motion disturbance to the occupant chair 22. Responsive to the motion signal(s), the controller 36 will transmit or otherwise output a control signal to one or both of the pitch and roll actuators 48, 50 to selectively pivot the pitch and roll plates and thereby counteract (i.e., offset or mitigate) the inertial motion disturbance. Due to the constraints of vehicle packaging and overall ride motions, the illustrated example can omit elements for directly counteracting yaw-axis motions. It may be desirable for the hinged motion described above to position the pitch axes on or around the estimated hip point (H-point) or a representative vehicle occupant OC1. Disclosed embodiments allow for chair heights (e.g., measured in the vertical Z-direction, from H-point to heel) that are within a range found in current vehicles to accommodate most occupants, e.g., 275 mm and 425 mm.

Aspects of the present disclosure are also directed to a vehicle architecture leveraging n-by-wire controls along with an articulated passenger space to enable improved ride experience, applicable to both autonomous and semi-autonomous vehicles. Unpleasant accelerations during autonomous operation (e.g., resulting in the spilling of a hot beverage), unpleasant vehicle motions (e.g., body roll during corners), and undesired Z-axis vehicle accelerations (e.g., bumps in the road) can be mitigated. To accomplish X-axis (roll) rotations, the vehicle passenger compartment can be articulated to the vehicle frame. Doing so can help to prevent interior packaging requirements from becoming prohibitively large, as a pair of driver-side and passenger-side seat assemblies swinging laterally within a passenger compartment can require additional clearance at the sides of the vehicle passenger compartment. Articulation of the passenger compartment can be controlled separately from the motion of the wheels relative to the chassis. Thus, in a turn, the vehicle chassis may roll toward the outside of the curve due to centrifugal forces, while the passenger compartment rolls inward based on actuators driven by an on-board control system responsive to data from vehicle-mounted accelerometers. This allows for decoupling of the suspension performance with respect to ride isolation from performance with respect to vehicle body motions. An articulated passenger compartment also allows for the inclusion of a new degree of control freedom (the rotation of the body about the X-axis, separate from that inherent in the vehicle's suspension system). This also allows for de-coupling of roll motions as experienced by the occupants from suspension tuning, which can negate the inherent trade-off in existing systems between ride quality (which favors a soft suspension) and body motion control (which favors a firm suspension). The separation of roll-motion compensation from the seat to the body, such that interior package size is preserved, helps to eliminate the need for excessive space around the occupant to accommodate roll articulation of the seat.

Articulation of the vehicle seats and vehicle passenger compartment can be driven in response to one or more accelerometers mounted on one or more of the seats. By contrast, many prior known systems utilize an accelerometer that is mounted to the vehicle body. The inclusion of accelerometers on the seat rather than the body can enable a simpler, more elegant control system by enabling a closed-loop control architecture. The control system serves to interpret data from the accelerometers, and use the sensor data to provide control signals to the seat and/or body actuators.

By attaching an accelerometer to the seat assembly rather than the vehicle body, a closed-loop system is enabled in which the overall direction of the accelerations to which the seat is subjected (represented by a normalized unit vector [x,y,z]) is compared to a reference unit vector (represented by vector [i,j,k]), and a dot product is calculated. Because friction can ultimately be limited to approximately 1.0 g, this implies that an angle between these two vectors will be approximately 45 degrees. The dot product value can then be used to scale the magnitude of the speed request sent to the actuation motors. As the actuation motors articulate the seat assembly and/or passenger compartment, the two vectors will become increasingly collinear, until they correspond, at which time the motors will cease to actuate. This control system is readily amenable to user-definable tuning. By changing a constant of proportionality between the dot-product of the vectors and the motor signal, the "quickness" of the system's response can be easily tuned. Similarly, by adjusting hysteresis limits, the sensitivity of the system can be readily adjusted. Because these tuning elements are both orthogonal and bounded, their adjustment by the user is readily implemented. In contrast, prior configurations utilize a system of accelerometers on the body to measure overall vehicle motion and orientation, and then calculates what motions of the seat are believed to counteract these, which requires detailed knowledge of the geometry of the seat and the path and position of all of the actuators, which is a computationally more difficult endeavor.

Figure 4:
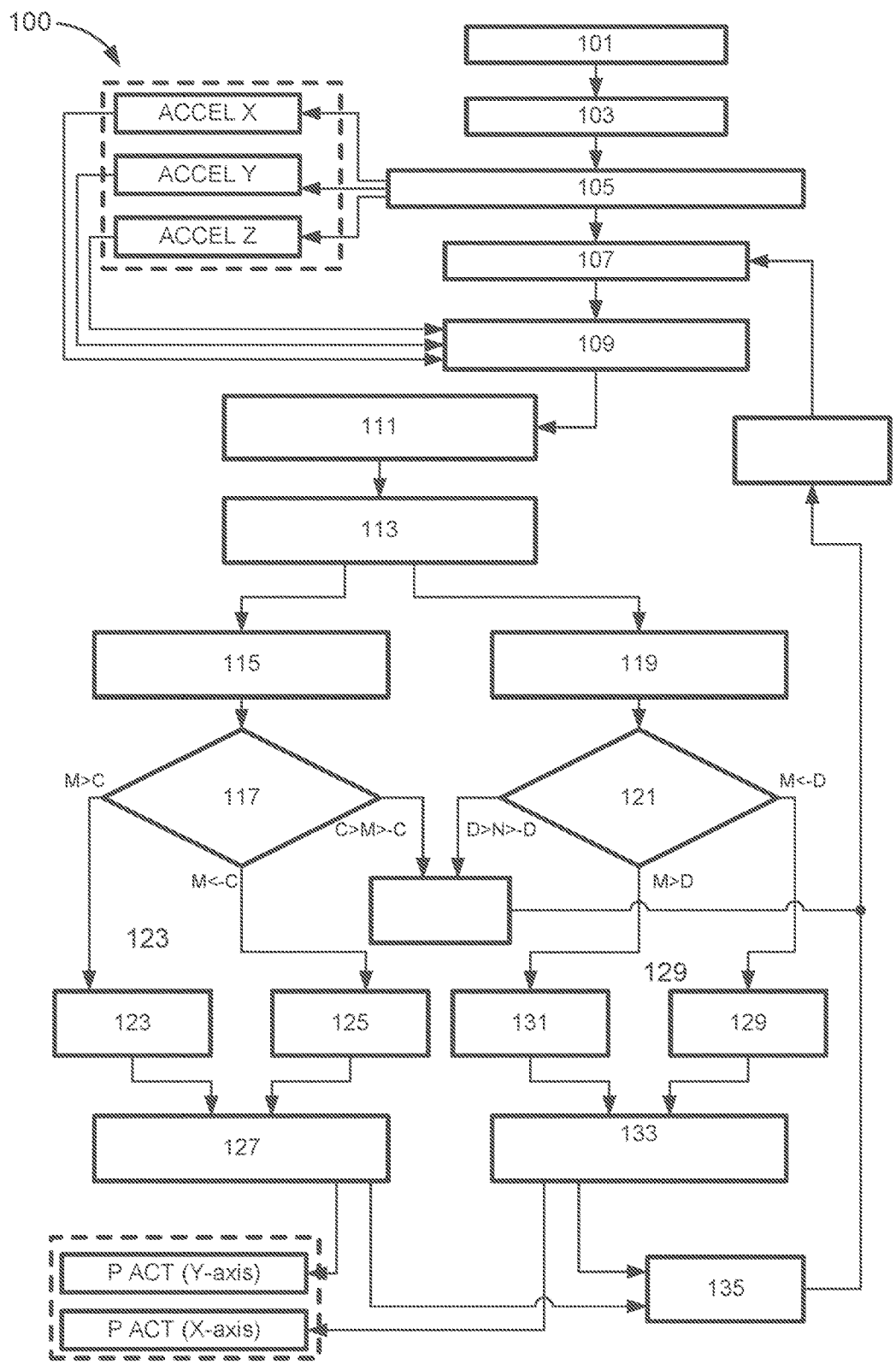
FIG. 4 is a flowchart for an algorithm or control scheme that corresponds to instructions executed by onboard control-logic circuitry of a motor vehicle in accord with aspects of the disclosed concepts.

With reference now to the flow chart of FIG. 4, an improved method for operating an active vehicle seat assembly to counteract or otherwise isolate an occupant from inertial forces and road-induced vibrations generated during operation of a motor vehicle, such as the automobile 10 shown in FIG. 1, for example, is generally described at 100 in accordance with aspects of the present disclosure. FIG. 4 can be representative of an algorithm that corresponds to at least some instructions that can be stored, for example, in main or auxiliary memory, and executed, for example, by the CPU or an on-board vehicle control system to perform any or all of the above or below described functions associated with the disclosed concepts.

The method 100 starts at block 101 with an initializing ("Power Up") operation where the automated chair system is brought online. At this time, any values stored in memory from a prior use can be purged. At block 103, a home operation is performed, e.g., after the user adjusts portions of the occupant chair 22 for comfort, whereat a Reference Position is set and the system can read values of the X-, Y- and Z-axis accelerometers. During the "Calculate Unit Reference Vector" step designated as 105 in FIG. 4, values stored as part of the "Set Reference Position" procedure at block 103 are combined and normalized into a unit vector, which can then be stored in memory, and used as a reference point in future steps. This may include communicating information with three accelerometers (or a single tri-axial accelerometer)—Accelerometer X, Accelerometer Y and Accelerometer Z—which may be part of a Sensor Feed for a Single Seat sensor array. After completing the initialization processes in these first three steps, the Main Loop of the control algorithm begins at 107.

At block 109, the method 100 will "Read Sensor(s)"—e.g., with the vehicle in motion, and undergoing accelerations, the system reads accelerometer data periodically, with a sampling time on the order of a fraction of a second. Values from the sensors are filtered through a Moving-Average Filter or other Low-Pass filter at block 111, e.g., to condition the data and remove the effects of short-duration spikes in accelerometer data. The conditioned sensor data is added and normalized into a unit vector, designated (x,y,z) at block 113 (Calculate Unit Acceleration Vector=|(X,Y,Z)|+(x,y,z)). The method 100 continues to block 115 where the vector (x,z) is cross-product multiplied with the vector (i,k), resulting in a value that represents the discrepancy between the set-point and the vehicle's net longitudinal and vertical acceleration (M=(i,k)·(x,z)). This discrepancy value M is then evaluated at 117. Simultaneously, at block 119, vector (y,z) is cross-product multiplied with (j,k) to produce a value that represents the discrepancy between the set-point and the vehicle's net transverse acceleration (N=(j,k)·(y,z)). This discrepancy value N is then evaluated at 121.

If a discrepancy value determined above at block 117 exceeds a threshold value C, a command signal is triggered at block 123 and/or 125 to actuate the automated platform assembly, e.g., moving the seat in cross-car (roll) rotation, in an attempt to eliminate the discrepancy between the set-point and measured acceleration values. Physically, this can correspond to tilting the seat until the vehicle's acceleration vector aligns with the original set-point vector. Commands to tilt the seat are executed via voltage control of the DC linear (roll) actuator. Motor voltage/speed can be modulated at block 127 (Motor voltage/speed V$\alpha$|M|). Output commands can be responsively output to Y-axis and X-axis pitch actuators or any of the other seat motor actuators. Likewise, if a discrepancy value determined above at block 119 is evaluated at block 121 to exceed a threshold value D, a command signal is triggered at blocks 129 and/or 131 to actuate the automated platform assembly, e.g., moving the seat in for-aft (pitch) rotation, in an attempt to eliminate the discrepancy between the set-point and measured acceleration values. Commands to tilt the seat are executed via voltage control of the DC linear (pitch) actuator. Motor voltage/speed can be modulated at block 133 (Motor voltage/speed V$\alpha$|M|). Method 100 can repeat at block 135 on an ongoing basis, constituting a closed-loop control system, maintaining the seat in an orientation that reflects a desired set-point position as determined above.

In some embodiments, the method 100 includes at least those steps enumerated above. It is also within the scope of the present disclosure to omit steps, combine steps, segment out steps, include additional steps, and/or modify the order presented above. It should be further noted that the method 100 represents a single control sequence for a single active vehicle seat assembly. However, it is expected that the method 100 be applied in a systematic and repetitive manner. For instance, when multiple active seats are present in a vehicle, each seat can be provided with its own sensor feed and controller for real-time execution of the illustrated control scheme. In embodiments with a tilting passenger compartment to compensate for roll motions, each seat can be provided with its own pitch actuator, while the roll actuator would be shared by all seats through the articulated passenger compartment. Note also that some of the parameters illustrated in the flowchart are tunable control limits to modulate steady-state motions of the seat.

Aspects of this disclosure can be implemented, in some embodiments, through a computer-executable program of instructions, such as program modules, generally referred to as software applications or application programs executed by an on-board vehicle computer. The software can include, in non-limiting examples, routines, programs, objects, components, and data structures that perform particular tasks or implement particular abstract data types. The software can form an interface to allow a computer to react according to a source of input. The software can also cooperate with other code segments to initiate a variety of tasks in response to data received in conjunction with the source of the received data. The software can be stored on any of a variety of memory media, such as CD-ROM, magnetic disk, bubble memory, and semiconductor memory (e.g., various types of RAM or ROM).

Moreover, aspects of the present disclosure can be practiced with a variety of computer-system and computer-network configurations, including multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network. In a distributed-computing environment, program modules can be located in both local and remote computer-storage media including memory storage devices. Aspects of the present disclosure can therefore, be implemented in connection with various hardware, software or a combination thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it can be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions can alternatively be used. For example, the order of execution of the blocks can be changed, and/or some of the blocks described can be changed, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. An active vehicle seat assembly for a motor vehicle, the motor vehicle having a vehicle body with a base plate, the vehicle body having mutually orthogonal longitudinal, lateral, and vertical axes, the active vehicle seat assembly comprising:
   an occupant chair including a backrest portion and a seat portion connected to the backrest portion;
   a motion sensor connected to the occupant chair and configured to detect motion of the occupant chair and output signals indicative thereof;
   an automated platform subjacent the seat portion and configured to movably mount the occupant chair to the vehicle body, the automated platform including:
   a pitch plate movably mounted to the seat portion, the pitch plate being configured to pivot relative to the lateral axis;
   a pitch actuator connected to and configured to selectively pivot the pitch plate;
   a roll plate pivotably mounted to the pitch plate, the roll plate being configured to pivotably mount to the base plate and pivot relative to the longitudinal axis; and
   a roll actuator connected to and configured to selectively pivot the roll plate; and
   a four-bar roll linkage with first and second roll actuation plates and first and second sets of roll pivot joints, the first set of roll pivot joints being configured to pivotably couple first ends of the first and second roll actuation plates to the base plate of the vehicle body, and the second set of roll pivot joints pivotably coupling second ends of the first and second roll actuation plates to the roll plate; and
   an on-board controller communicatively connected to the motion sensor, the pitch actuator, and the roll actuator, the on-board controller being operable to respond to a motion signal from the motion sensor indicative of an inertial motion disturbance to the occupant chair and output a control signal to one or both of the pitch and roll actuators to selectively pivot one or both of the pitch and roll plates and thereby counteract the inertial motion disturbance.

2. The active vehicle seat assembly of claim 1, wherein the roll pivot joints define first and second roll axes mutually parallel with the longitudinal axis of the vehicle body, the roll plate pivoting about the first roll axis when rolling in a first direction and pivoting about the second roll axis when rolling in a second direction opposite the first direction.

3. The active vehicle seat assembly of claim 1, wherein the roll actuator includes an electronically actuable linear actuator rotatably coupled at a first end thereof to the roll plate and configured to rotatably couple at a second end thereof to the base plate of the vehicle body.

4. The active vehicle seat assembly of claim 3, wherein the linear actuator includes a piston with a spherical joint defining the first end rotatably coupled to the roll plate, and a roller hinge defining the second end configured to rotatably couple to the base plate.

5. The active vehicle seat assembly of claim 4, wherein the pitch plate is slidably mounted to the seat portion and interposed between the roll plate and the seat portion.

6. The active vehicle seat assembly of claim 5, wherein the pitch pivot joints define first and second pitch axes mutually parallel with the lateral axis of the vehicle body, the pitch plate pivoting about the first pitch axis when pitching in a first direction and pivoting about the second pitch axis when pitching in a second direction opposite the first direction.

7. The active vehicle seat assembly of claim 5, wherein the pitch actuator includes an electronically actuable linear actuator rotatably coupled at a first end thereof to the pitch plate and configured to rotatably couple at a second end thereof to the base plate of the vehicle body.

8. The active vehicle seat assembly of claim 7, wherein the linear actuator includes a piston with a spherical joint defining the first end rotatably coupled to the pitch plate, and a roller hinge defining the second end configured to rotatably couple to the base plate.

9. The active vehicle seat assembly of claim 8, wherein the roll plate and the pitch plate each has a polyhedral panel shape.

10. The active vehicle seat assembly of claim 1, further comprising a four-bar pitch linkage with first and second pitch actuation plates and first and second sets of pitch pivot joints, the first set of pitch pivot joints pivotably coupling first ends of the pitch actuation plates to the roll plate, and the second set of pitch pivot joints pivotably coupling second ends of the pitch actuation plates to the pitch plate.

11. The active vehicle seat assembly of claim 1, further comprising a pair of seat tracks mounted on the pitch plate and a pair of glide rails mounted to the seat portion of the occupant chair, the glide rails each being slidably coupled to a respective one of the seat tracks.

12. The active vehicle seat assembly of claim 1, wherein the motion sensor includes a 3-axis accelerometer.

13. The active vehicle seat assembly of claim 1, further comprising a position sensor connected to the occupant chair and configured to detect a position of the occupant chair relative to the automated platform and output a signal indicative thereof to the on-board controller.

14. A motor vehicle, comprising:
a vehicle body defining a passenger compartment with a base plate;
an occupant chair including a backrest portion, a seat portion connected to the backrest portion, and a pair of glide rails connected to the seat portion;
a 3-axis accelerometer configured to detect motion of the occupant chair and output signals indicative thereof;
an automated platform subjacent the seat portion, the automated platform including:
a pitch plate with a pair of seat tracks slidably mated with the glide rails to thereby movably mount thereon the seat portion of the occupant chair;
a roll plate interposed between the pitch plate and the base plate such that the pitch plate is mounted on the roll plate and the roll plate is mounted on the base plate;
a four-bar pitch linkage pivotably coupling the pitch plate to the roll plate such that the pitch plate is pivotable about first and second pitch axes mutually parallel to a lateral axis of the vehicle body;
a four-bar roll linkage pivotably coupling the roll plate to the base plate such that the roll plate is pivotable about first and second roll axes mutually parallel to a longitudinal axis of the vehicle body;
an electronically actuable linear pitch actuator connected to and configured to selectively pivot the pitch plate about the first and second pitch axes; and
an electronically actuable linear roll actuator connected to and configured to selectively pivot the roll plate about the first and second roll axes; and
an on-board controller communicatively connected to the 3-axis accelerometer, the pitch actuator, and the roll actuator, the on-board controller being operable to respond to a motion signal from the accelerometer indicative of an inertial motion disturbance to the occupant chair and output a control signal to one or both of the pitch and roll actuators to selectively pivot one or both of the pitch and roll plates and thereby counteract the inertial motion disturbance.

15. A method of constructing an active vehicle seat assembly for a motor vehicle, the motor vehicle having a vehicle body with a base plate, the method comprising:
providing an occupant chair including a backrest portion and a seat portion attached to the backrest portion;
attaching a motion sensor to the occupant chair, the motion sensor being configured to detect motion of the occupant chair and output signals indicative thereof;
attaching an automated platform to the seat portion, the automated platform being configured to movably mount to the vehicle body, the automated platform including:
a pitch plate movably mounted to the seat portion, the pitch plate being configured to pivot relative to the lateral axis;
a pitch actuator connected to and configured to selectively pivot the pitch plate;
a roll plate pivotably mounted to the pitch plate, the roll plate being configured to pivotably mount to the base plate and pivot relative to the longitudinal axis; and
a roll actuator connected to and configured to selectively pivot the roll plate; and
a four-bar roll linkage with first and second roll actuation plates and first and second sets of roll pivot joints, the first set of roll pivot joints being configured to pivotably couple first ends of the first and second roll actuation plates to the base plate of the vehicle body, and the second set of roll pivot joints pivotably coupling second ends of the first and second roll actuation plates to the roll plate; and
communicatively connecting an on-board controller to the motion sensor, the pitch actuator, and the roll actuator, the on-board controller being operable to respond to a motion signal from the motion sensor indicative of an inertial motion disturbance to the occupant chair and output a control signal to one or both of the pitch and roll actuators to selectively pivot one or both of the pitch and roll plates and thereby counteract the inertial motion disturbance.

16. The method of claim 15, further comprising attaching a four-bar pitch linkage to the pitch plate, the four-bar pitch linkage including first and second pitch actuation plates and first and second sets of pitch pivot joints, the first set of pitch pivot joints being configured to pivotably couple first ends of the pitch actuation plates to the roll plate, and the second set of pitch pivot joints pivotably coupling second ends of the pitch actuation plates to the pitch plate.

17. The method of claim 15, wherein the roll actuator includes an electronically actuable linear actuator rotatably coupled at a first end thereof to the roll plate and configured to rotatably couple at a second end thereof to the base plate of the vehicle body.

18. The method of claim 15, wherein the pitch actuator includes an electronically actuable linear actuator rotatably coupled at a first end thereof to the pitch plate and configured to rotatably couple at a second end thereof to the base plate of the vehicle body.

19. The method of claim 15, wherein the roll pivot joints define first and second roll axes mutually parallel with the longitudinal axis of the vehicle body, the roll plate pivoting about the first roll axis when rolling in a first direction and pivoting about the second roll axis when rolling in a second direction opposite the first direction.

20. The method of claim 15, wherein the pitch plate is slidably mounted to the seat portion and interposed between the roll plate and the seat portion.

\* \* \* \* \*